(12) United States Patent
Jourdan et al.

(10) Patent No.: US 12,717,087 B2
(45) Date of Patent: Aug. 25, 2026

(54) PHOTONIC DEVICE MECHANICALLY ISOLATED FROM A SUBSTRATE

(71) Applicant: Commissariat à l'Énergie Atomique et aux Énergies Alternatives, Paris (FR)

(72) Inventors: Guillaume Jourdan, Grenoble (FR); Marc Gely, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 311 days.

(21) Appl. No.: 18/528,485

(22) Filed: Dec. 4, 2023

(65) Prior Publication Data

US 2024/0192446 A1 Jun. 13, 2024

(30) Foreign Application Priority Data

Dec. 8, 2022 (FR) ...................................... 2212954

(51) Int. Cl.
*G02B 6/293* (2006.01)
*G02B 6/35* (2006.01)

(52) U.S. Cl.
CPC ....... *G02B 6/29338* (2013.01); *G02B 6/3508* (2013.01)

(58) Field of Classification Search
None
See application file for complete search history.

(56) References Cited

U.S. PATENT DOCUMENTS 7,667,200 B1 * 2/2010 Watts ........................ G01J 5/08 250/338.1
10,247,676 B1 * 4/2019 Shaw ................ G02B 6/02052
2011/0255822 A1 * 10/2011 Zheng .................. G02B 6/3508 385/16
2014/0076024 A1 * 3/2014 Duraffourg ............ G01N 30/66 73/23.4

(Continued)

FOREIGN PATENT DOCUMENTS

EP 3 425 344 A1 1/2019
EP 3 509 214 A1 7/2019
FR 3 041 761 B1 5/2019

OTHER PUBLICATIONS

Ripin et al., One-Dimensional Photonic Bandgap Microcavities for Strong Optical Confinement in GaAs and GaAs/AlxOy Semiconductor Waveguides. J. of Lightwave Technology, IEEE. Nov. 30, 1999;17(11):2152-60.

(Continued)

*Primary Examiner* — Jerry Rahll
(74) *Attorney, Agent, or Firm* — Wolf, Greenfield & Sacks, P.C.

(57) ABSTRACT

A photonic device including a substrate and a structure. The structure includes a support, an optical resonator fixed to the support, and a portion of a waveguide optically coupled to the resonator and fixed to the support. The structure is suspended above the substrate. The portion of the waveguide and the resonator are arranged on a same side of the support. The support is a first portion of a layer. A second portion of the layer is fixed to the substrate. The support is mechanically coupled to the second portion of the layer.

23 Claims, 6 Drawing Sheets

(56) References Cited

U.S. PATENT DOCUMENTS

| | | | | |
|---|---|---|---|---|
| 2015/0107357 | A1* | 4/2015 | Hentz | G01D 5/268<br>73/382 G |
| 2018/0006424 | A1* | 1/2018 | Vahala | G02F 1/395 |
| 2018/0172728 | A1* | 6/2018 | Aksyuk | H01J 37/3174 |
| 2021/0255213 | A1 | 8/2021 | Otugen et al. | |

OTHER PUBLICATIONS

Preliminary Search Report for French Application No. 2212954, dated May 22, 2023.

Miao et al., A Microelectromechanically Controlled cavity Optomechanical Sensing System. New J. of Physics. Jul. 19, 2012; 14(7):075015.

* cited by examiner 118
1
B
C
114
102
110
122
108
120
112
A
128
124
116
104
100

106
132
126
130

PHOTONIC DEVICE MECHANICALLY ISOLATED FROM A SUBSTRATE

CROSS REFERENCE TO RELATED APPLICATIONS

This application claims priority to French application number 2212954, filed Dec. 8, 2022, the contents of which are incorporated herein by reference in its entirety.

TECHNICAL FIELD

The present disclosure generally concerns integrated circuits, and, more particularly, photonic integrated circuits.

PRIOR ART

Known photonic circuits comprise a waveguide and an optical resonator optically coupled to each other. The optical resonator is, for example, a disk, a circular ring, a racetrack-shaped oblong ring, or also a photonic crystal structure such as a Bragg mirror structure. In these known circuits, the waveguide and the optical resonator are defined in a same layer, and are each fixed to the substrate of the photonic circuit. The optical coupling space between the waveguide and the optical resonator is empty, that is, it is not filled with a solid material.

In such circuits, a change of the material (liquid or gas) which is present in the optical coupling space between the waveguide and the resonator has a direct influence on the properties of the coupling between the waveguide and the resonator. These circuits are thus sensitive to optical index variations in the coupling space between the waveguide and the resonator and can thus, for example, be used as sensors.

However, this implies keeping constant the coupling space between the waveguide and the resonator. Now, when the substrate having the resonator and the waveguide fixed thereto deforms, this causes a modification of the optical coupling space between the waveguide and the resonator, which makes the circuit inoperative or sensitive to a parasitic signal.

In such circuits, it may further be provided for a mobile mechanical element to be arranged close to the optical resonator, and to be separated therefrom by a space comprising no solid material. The mobile element is mechanically coupled to the substrate by flexible deformable coupling elements, so that the mechanical element can displace with respect to the substrate. When the mechanical element displaces, this causes a modification of the empty space between the mechanical element and the resonator, and thus a modification of the effective optical index du resonator and thus of its resonance wavelength. This enables to measure the displacement of the mechanical element, for example to measure an acceleration having caused the displacement of the mechanical element.

However, when the substrate to which is fixed the resonator and is coupled the mechanical element deforms, this causes a modification of the space between the mobile element and the resonator, which alters the measurement.

Thus, in many known photonic circuits, it would be desirable for at least one empty space between optical and/or mechanical elements of the photonic circuit not to be modified by deformations of the substrate.

SUMMARY OF THE INVENTION

There exists a need to overcome all or part of the disadvantages of known photonic circuits, for example of the above-described known photonic circuits.

For example, there exists a need to overcome all or part of the disadvantages of known photonic circuits comprising a waveguide and an optical resonator optically coupled to each other by an empty space, where these photonic circuits may further comprise a mobile mechanical element having its displacements modifying the optical properties of the optical resonator or the optical coupling between the resonator and the waveguide.

An embodiment overcomes all or part of the disadvantages of known photonic circuits, for example of the above-described known photonic circuits.

For example, an embodiment overcomes all or part of the disadvantages of known photonic circuits comprising a waveguide and an optical resonator optically coupled to each other by an empty space, where these photonic circuits may further comprise a mobile mechanical element having its displacements modifying the optical properties of the optical resonator or the coupling between the resonator and the waveguide.

An embodiment provides a photonic device comprising:

a substrate; and a structure comprising a support, an optical resonator fixed to the support, and a portion of a waveguide, the portion of the waveguide being optically coupled to the optical resonator, wherein:

the portion of the waveguide is fixed to the support;

the structure is suspended above the substrate;

the portion of the waveguide and the resonator are arranged on a same side of the support, for example under the support;

the support corresponds to a first portion of a first layer;

a second portion of the first layer is fixed to the substrate; and the support is mechanically coupled to the second portion of the first layer.

According to an embodiment, the mechanical coupling of the support to the second portion of the first layer comprises:

a connection of the support to a first region of the second portion of the first layer; and/or at least one third portion of the first layer suspended above the substrate and being connected on the one hand to a second region of the second portion of the first layer and on the other hand to the support.

According to an embodiment, the mechanical coupling of the support to the second portion of the first layer comprises the connection of the support to the first region of the second portion of the first layer and comprises no third portion of the first layer, said connection implementing a rigid link between the support and the second portion of the first layer.

According to an embodiment, the mechanical coupling of the support to the second portion of the first layer comprises said at least one third portion of the first layer and comprises no connection between the support and the second portion of the first layer, said at least one third portion of the first layer comprising:

a plurality of third portions, each implementing a flexible link between the support and the second portion of the first layer, or a plurality of third portions, a single one of said third portions implementing a rigid or semi-rigid link between the support and the second portion of the first layer, and the other third portions each implementing a flexible link between the support and the second portion of the first layer, or a single third portion implementing a rigid or semi-rigid link between the support and the second portion of the first layer.

According to an embodiment, the mechanical coupling of the support to the second portion of the first layer comprises the connection of the support to the first region of the second portion of the first layer and said at least one third portion of the first layer, said connection implementing a rigid link between the support and the first region of the second portion of the first layer, and each third portion of the first layer implementing a flexible link between the support and the second region of the second portion of the first layer.

According to an embodiment, the waveguide and the resonator are defined in a same third layer.

According to an embodiment, the portion of the waveguide is fixed to the support by arms defined in the third layer, each of said arms having an end in contact with the portion of the waveguide and an end fixed to the support.

According to an embodiment:

the waveguide comprises another portion which does not form part of the structure and being, preferably, arranged beyond the structure; and arms defined in the third layer each comprise an end in contact with this other portion of the waveguide arranged beyond the structure and an end fixed to the substrate.

According to an embodiment:

the support comprises at least one decoupling portion;

the support comprises flexible or semi-rigid links coupling said at least one decoupling portion to a portion of the support which is mechanically coupled to the second portion of the first layer; and at least the resonator is more directly mechanically coupled to said at least one decoupling portion than to the portion of the support which is mechanically coupled to the second portion of the first layer.

According to an embodiment, the structure comprises a mobile portion, said mobile portion being more directly mechanically coupled to said at least one decoupling portion than to the portion of the support which is mechanically coupled to the second portion of the first layer.

According to an embodiment, the structure comprises a portion mobile with respect to a portion of the support which is mechanically coupled to the second portion of the first layer.

According to an embodiment:

the mobile portion of the structure is a mobile portion of the support;

among the resonator and the portion of the waveguide forming part of the structure, one is fixed to the mobile portion of the support and the other is fixed to another portion of the support; and the structure is configured so that a displacement of the mobile portion of the structure in a direction parallel to the substrate causes a corresponding modification of the optical coupling between said waveguide portion and the resonator.

According to an embodiment:

the mobile portion of the structure comprises a mobile portion of the support;

the portion of the waveguide forming part of the structure and the resonator are fixed to another portion of the support than the mobile portion of the support;

the mobile portion of the support comprises a region arranged in front of a portion of the resonator in a direction orthogonal to the substrate; and the structure is configured so that a displacement of the mobile portion of the structure in the direction orthogonal to the substrate causes a corresponding variation of the effective index of the resonator.

According to an embodiment:

the mobile portion of the structure comprises a stack comprising a portion of the third layer and a mobile portion of the support; and in a direction parallel to the substrate, said portion of the third layer is separated from the resonator by a space configured so that a displacement of the mobile portion of the structure in this direction causes a corresponding variation of the effective optical index of the resonator.

According to an embodiment, the mobile portion of the support is mechanically coupled to the rest of the support by flexible links at least partly defined in the first portion of the first layer.

According to an embodiment:

the mobile portion of the structure is defined in the third layer; and in a direction parallel to the substrate, the mobile portion of the structure is separated from the resonator by a space configured so that a displacement of the mobile portion of the structure in this direction causes a corresponding variation of the effective optical index of the resonator.

According to an embodiment, the mobile portion of the structure is mechanically coupled to the support by at least one portion of the third layer, said at least one portion being less rigid than the mobile portion.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF EMBODIMENTS

Figures 1, 2, 3, 4:
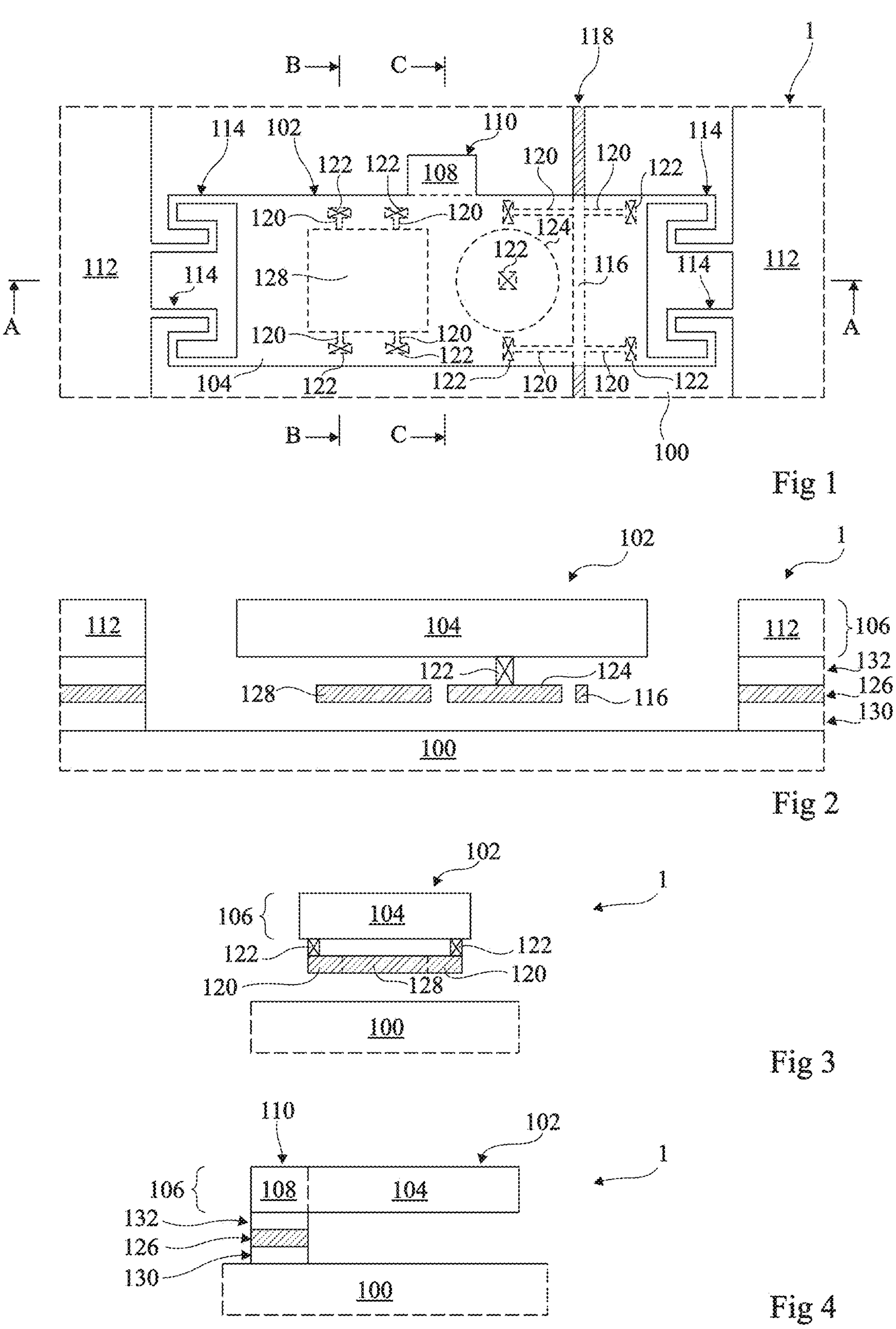
FIG. 1 shows, in a simplified top view, an example of embodiment of a photonic circuit.
FIG. 2 shows, in a simplified cross-section view, the circuit of FIG. 1 taken in the cross-section plane AA of FIG. 1.
FIG. 3 shows, in a simplified cross-section view, the circuit of FIG. 1 taken in the cross-section plane BB of FIG. 1.
FIG. 4 shows, in a simplified cross-section view, the circuit of FIG. 1 taken in the cross-section plane CC of FIG. 1.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the photonic circuit manufacturing methods described herein have not been detailed, the manufacturing of the embodiments and variants of these photonic circuits based on usual steps of manufacturing of known photonic circuits being within the abilities of those skilled in the art based on the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

To avoid the disadvantages of known photonic circuits, for example of the previously-described known photonic circuits, there is here provided a photonic circuit comprising a structure suspended above the substrate of the photonic circuit. The suspended structure comprises a support and optical and/or mechanical elements between which it is desired to keep one or a plurality of empty spaces having dimensions independent from the deformations of the substrate. These optical and/or mechanical elements are then fixed to the support of the suspended structure rather than to the substrate. Thus, when the substrate deforms, the relative positions of these optical and/or mechanical elements are not affected by this, although the support of the structure is mechanically coupled to the substrate so that the structure is suspended above the substrate.

Unless indicated otherwise, when reference is made to an element anchored, fixed, attached, or hooked to the support, this signifies that this element is mechanically coupled to the support, itself being coupled to the substrate. For example, in other words, this signifies that this element is mechanically coupled to the substrate via the support. For example, still in other words, this signifies that the mechanical link between this element and the support is shorter (or more direct) than each mechanical link that this element has with the substrate.

Symmetrically, unless indicated otherwise, when reference is made to an element anchored, fixed, attached, or hooked to the substrate, this signifies that this element is mechanically coupled to the substrate, itself being coupled to the support. For example, in other words, this signifies that this element is coupled to the support via the substrate. For example, still in other words, this signifies that the mechanical link between this element and the substrate is shorter (or more direct) than each mechanical link that this element has with the support.

FIG. 1 illustrates, in a simplified top view, an example of embodiment of a photonic circuit 1, FIG. 2 being a simplified cross-section view taken in the cross-section plane AA of FIG. 1, FIG. 3 being a simplified cross-section view taken in the cross-section plane BB of FIG. 1, and FIG. 4 being a simplified cross-section view taken in the cross-section plane CC of FIG. 1.

Circuit 1 comprises a substrate 100, for example a semiconductor substrate, for example made of silicon. In other words, circuit 1 is formed on substrate 100.

Circuit or device 1 comprises a structure 102. Structure 102 is suspended above substrate 100. More particularly, structure 102 comprises a support 104. Support 104 is suspended above substrate 100. Support 104 corresponds to a first part (or portion) of a layer 106, for example made of silicon, and layer 106 comprises a second portion fixed to the support, the first and second portions of layer 106 being mechanically coupled to each other. In other words, the second portion of layer 106 rests on substrate 100 to which it is fixed, for example via a stack of layers connected to one another two by two, and the mechanical coupling of the first and second portions of layer 106 to each other enables to keep the first portion of layer 106 (support 104) suspended above the substrate.

According to an embodiment, as illustrated in the example of FIGS. 1 to 4, the second portion of layer 106 comprises a first region 108 in contact with, or connected to, support 104. This region 108 is fixed to substrate 100, for example via a stack of layers connected to one another two by two. This region 108 has, for example, dimensions taken in a plane parallel to substrate 100 which are smaller, for example at least five times smaller, preferably at least ten times smaller, than those of support 104. In the example of FIGS. 1 to 4, region 108 is arranged against and in contact with a rectilinear edge of support 104. In other examples not illustrated, region 108 is surrounded by support 104, for example when region 108 is arranged in a central portion of support 104, all or part of the periphery of region 108 then being in contact with support 104. In FIGS. 1 and 4, the limit between region 108 and the periphery of support 104 is indicated by dotted lines.

According to an embodiment, region 108 forms part of a pad 110 for anchoring support 104 to substrate 100. Pad 110 comprises a portion connected to, and in contact with, support 104 and another portion connected to, and in contact with, substrate 100. The connection of pad 110 to support 104 implements a rigid mechanical link of support 104 to region 108 of layer 106, and thus a rigid mechanical link of support 104 to substrate 100, due to the fact that the rigidity of this link is substantially equal to, or even greater than, that of the support, for example substantially equal to, or even greater than, that of the portion of support 104 to which pad 110 is connected.

Pad 110 enables to implement a low-pass function for the transmission of the vibrations of substrate 100 to support 104. For example, calling Kar the rigidity of the mechanical link between pad 110 and support 104 and m the mass of structure 102, the cut-off frequency fc1 of this low-pass function is equal to $(Kar/m)^{0.5}$. By sizing pad 110 to obtain a desired rigidity value Kar, it is possible to filter external disturbances such as, for example, vibrations of substrate 100 and/or deformation of substrate 100.

Preferably, there is no more than one rigid pad 110 for anchoring support 104 to substrate 100. Thus, when substrate 100 deforms, this may cause a displacement of pad 110 which is fixed to substrate 100, and thus a displacement of support 104 which is then fixed to pad 110, but this causes no corresponding deformation of support 104.

According to an embodiment, as illustrated in the example of FIGS. 1 to 4, the second portion of layer 106 comprises at least one second region 112 coupled to support 104. Each region 112 is fixed to substrate 100, for example via a stack of layers connected to one another two by two. In such an embodiment, layer 106 further comprises at least one third portion 114, for example four portions 114 in the example of FIG. 1, each coupling support 104 to a region 112 of layer 106. In other words, each portion 114 of layer 106 has an end connected to, and in contact with, support 104, and another end fixed to, and in contact with, a region 112 of layer 106. In the example of FIGS. 1 to 4, each portion 114 of layer 106 extends between the periphery of support 104 and region 112 of layer 106. In other examples not illustrated, support 104 is crossed by an opening inside of which is arranged region 112 of layer 106, and each portion 114 of layer 106 extends from region 112 to support 104.

Preferably, calling Lmax the largest dimension of support 104 taken in a plane parallel to substrate 100, the maximum distance between each region 112 of layer 106 and support 104 taken in a plane parallel to substrate 100 is smaller than 3*Lmax/2.

According to an embodiment, each portion 114 of layer 106 implements, or forms part of, a flexible link of support 104 with a region 112 of layer 106. In this case, each portion 114 of layer 106 is for example configured to be less rigid than support 104, for example less rigid than the portion of support 104 with which link 114 is in contact. A link 114 is called flexible, for example since its rigidity is lower, for example at least 10 times lower, than that of support 104 and, preferably, than that of the portion of support 104 to which is connected link 114. Link 114 is called flexible, for example, since it is less rigid than the mechanical link between anchor pad 110 and support 104. Those skilled in the art are capable of implementing the flexible links of support 104 with region 112 of layer 106. For example, each portion 114 of layer 106 has the shape of a beam, or of a plurality of beams placed end-to-end to form at least one meander, each beam having, in a plane parallel to substrate 100, a transverse dimension smaller than the transverse dimensions of support 104 and, preferably, to the transverse dimensions of the periphery of support 104.

Preferably, there are at least two flexible links coupling support 104 to region 112 of layer 106. For example, when support 104 has a rectangular peripheral shape, a flexible link is provided at each corner of the periphery of support 104.

The flexible links of support 104 to one or a plurality of regions 112 of layer 106 enable to implement a low-pass function for the transmission of the vibrations or of the deformations of substrate 100 to support 104. For example, the cut-off frequency of this low-pass function is lower than the cut-off frequency fc1 determined by the mechanical link between pad 110 and support 104. Those skilled in the art will understand that, in a configuration where device 1 comprises flexible links of support 104 with one or a plurality of regions 112 of layer 106, and, further, a rigid link between support 104 and a pad 110, the frequency of the low-pass filtering function implemented by these flexible links and this rigid link is then imposed by the rigid link.

These flexible links of support 104 with region 112 of layer 106 enable to withstand deformations of substrate 100, so that a deformation of substrate 100 causes no corresponding deformation of support 104.

According to an embodiment where the device comprises no pad 110 connected to support 104, each portion 114 of layer 106 implements, or forms part of, a flexible link of support 104 with a region 112 of layer 106 as previously described, except for a portion 114 which implements, or forms part of, a rigid link of support 104 with a region 112 or of a link having an intermediate rigidity between the rigidity of the flexible links and the rigidity of a rigid link. In other words, in a configuration where device 1 comprises no rigid link of support 104 with a pad 100 but only comprises links of support 104 with one or a plurality of regions 112 of layer 106, either all these links are flexible and have similar or identical rigidities, or all these links are flexible and have similar rigidities except for one of the links which has an intermediate rigidity between the rigidity of the flexible links and the rigidity of support 104 or which has a rigidity substantially equal to that of support 104. The most rigid of the links of support 104 with one or a plurality of region 112 of layer 106 is that which determines the cut-off frequency of the low-pass function implemented by these couplings.

As an example, each flexible link 114 is configured to be less rigid than support 104, for example less rigid than the portion of support 104 with which flexible link 114 is in contact. Preferably, a link 114 is called flexible because its rigidity is lower, for example at least 10 times lower, than that of support 104 and, preferably, than that of the portion of support 104 to which is connected link 114. A link 114 is called flexible, for example, because it is less rigid than the mechanical link between anchor pad 110 and support 104.

As an example, when the links 114 of support 104 with one or a plurality of regions 112 of the layer 106 are all flexible except for one, which is rigid, the single rigid link 114 is for example configured to be substantially as rigid, or even more rigid, than support 104, for example substantially as rigid or more rigid than the portion of support 104 with which rigid link 114 is in contact. This link 114 is called rigid, for example because its rigidity is substantially equal to, or even greater than, that of support 104 and, preferably, to that of the portion of support 104 to which is connected rigid link 114. This link 114 is called rigid, for example, because it is substantially as rigid, or even more rigid, than a mechanical link between an anchor pad 110 and support 104.

As an example, when the links 114 of support 104 with one or a plurality of regions 112 of layer 106 are all flexible except for one which has an intermediate rigidity between that of the flexible links and that of support 104, the only link of intermediate rigidity 114 is, for example, configured to be substantially less rigid than support 104, for example less rigid than the portion of support 104 with which the link of intermediate rigidity 114 is in contact, while remaining more rigid than flexible links. This link 114 is said to have an intermediate rigidity, for example because its rigidity is between that of support 104, preferably that of the portion of support 104 to which this link is connected, and that of flexible links.

An advantage of providing a device 1 comprising no connection rigid link of support 104 to a pad 110, and comprising links of support 104 with one or a plurality of regions 112 of layer 106, which are all flexible except for one which has an intermediate rigidity, is that the cut-off frequency of the low-pass function implemented by these links may be adapted according to the targeted application by accordingly adapting the rigidity of this link of intermediate rigidity.

Those skilled in the art are capable of implementing each flexible link 114 of support 104 with a region 112 of layer 106. For example, each flexible link 114 has the shape of a beam, or of a plurality of beams placed end-to-end to form at least one meander, each beam having, in a plane parallel to substrate 100, a transverse dimension smaller than the transverse dimensions of support 104 and, preferably, than the transverse dimensions of the periphery of support 104. Those skilled in the art are also capable of implementing, when such a link is provided, the single link, rigid or of intermediate rigidity, of support 104 with a region 112 of the layer 106. For example, this rigid or semi-rigid link 114 has the shape of beam sufficiently wide to be more rigid than flexible links 114.

Thus, although FIG. 1 illustrates an example of an embodiment where circuit 1 comprises links 114 which are all flexible and a single anchor pad 110, in alternative embodiments, circuit 1 may comprise a single pad 110 with no link 114, or may only comprise flexible links 114 without pad 110, or may also only comprise flexible links 114 (without pad 110) except for one which is rigid or semi-rigid.

Suspended structure 102 further comprises a portion 116 of a waveguide 118. Portion 116 of waveguide 118 is arranged under support 104, that is, between support 104 and substrate 100.

Portion 116 of waveguide 118 is fixed to support 104. More particularly, portion 116 is suspended under support 104. In FIG. 1, elements of structure 102, including portion 116 of waveguide 118, which are arranged under support 104 are shown in dotted lines.

An empty space separates support 104 from portion 116 of waveguide 118. For example, portion 116 is fixed to support 104 by holding arms 120, each having an end connected to, and in contact with, portion 116 of waveguide 118, and another end fixed to support 104. For example, in each holding arm 120, the end of arm 120 fixed to support 104 is connected to, and in contact with, an anchor pad 122 connected between support 104 and arm 120. In FIG. 1, anchor pads 122 are each shown by a cross.

Suspended structure 102 further comprises an optical resonator 124, for example a disk in the example of FIG. 1, although, in other examples not shown, this resonator 124 can have others shapes or be a photonic crystal structure. Resonator 124 is arranged under support 104, that is, between support 104 and substrate 100.

Resonator 124 is fixed to support 104. A portion of resonator 124 is separated from the support by an empty space, or, in other words, a portion of resonator 124 is suspended under support 104. For example, resonator 124 is fixed to the support by at least one anchor pad 122 similar to those used to fix portion 116 of waveguide 118 to support 104. For example, each anchor pad 122 has, in a plane parallel to substrate 100, dimensions smaller than those of resonator 124. Preferably, when the resonator has the shape of a ring or of a disk or of a loop, each anchor pad 122 is arranged in a region laterally delimited by the outer edge of the ring, of the disk, or of the loop, preferably at the center of the ring or of the disk or of the loop to limit optical losses in resonator 124. When resonator 124 has the shape of a closed loop or of a ring, holding arms defined in the same layer as resonator 124 each extend from resonator to a corresponding pad 122. For example, all the holding arms starting from resonator 124 join on a single pad 122, preferably arranged at the center of resonator 124. As an alternative example, all the holding arms comprise a first portion starting from the resonator and extending all the way to the center of resonator 124, and a second portion, common to all holding arms, extending from the center of resonator 124 to a pad 122 offset with respect to the center of resonator 124.

Resonator 124 and portion 116 of waveguide 118 are optically coupled to each other. For example, in a plane parallel to substrate 100 and in a direction orthogonal to the longitudinal direction of portion 116 of waveguide 118, portion 116 and resonator 124 are optically coupled to each other at the location where the space between waveguide 118 and resonator 124 is the smallest. In the rest of the description, this space where waveguide 118 and resonator 124 are optically coupled to each other is called coupling space or optical space.

Due to the fact that resonator 124 and portion 116 of waveguide 118 are fixed to support 104 and form part of suspended structure 102, when substrate 100 undergoes deformations, the latter do not modify the dimensions of the coupling space between resonator 124 and waveguide 118.

Waveguide 118, and thus portion 116 of waveguide 118, and resonator 124 are formed from, or defined in, a same layer 126. The visible portions of layer 126 are hatched in FIGS. 1 to 4. Due to the fact that resonator 124 and waveguide 118 are defined in the same layer 126, resonator 124 and portion 116 of waveguide 118 are aligned in a plane parallel to substrate 100.

As an example, the stack of layers of anchor pad 110 connecting region 108 of layer 106 to substrate 100 comprises a portion of layer 126, although this is not the case for other examples not illustrated.

As an example, the stack of layers fixing region 112 of layer 106 to substrate 100 comprises a portion of layer 126, although this is not the case in other examples not illustrated.

Layer 126 is made of a material adapted to propagating light at the operating wavelengths of circuit 1. As an example, layer 126 is made of silicon, of silicon nitride, of arsenic gallium, or of germanium.

Like waveguide 118, the holding arms 120 which fix portion 116 of waveguide 118 are also defined in layer 126.

Suspended structure 102 may further comprise, optionally, a mechanical element mobile with respect to the rigid periphery of support 104. This element, which is a portion of structure 102, is configured so that its displacements with respect to support 104 modify the optical properties, for example the effective optical index, of portion 116 of waveguide 118 and/or of resonator 124. In the example of embodiment of FIGS. 1 to 4, structure 102 comprises such a mobile mechanical element.

More particularly, in the example of FIGS. 1 to 4, this mobile mechanical element, that is, the mobile portion of structure 102, is a portion of layer 126, designated by reference 128 in these drawings. An empty space separates support 104 from all or part of mobile portion 128.

In a direction parallel to substrate 100, the mobile portion 128 of structure 102 is separated from resonator 124 by a space, called mechanical space. The mechanical space, or, in other words, mobile portion 128 and resonator 124, are configured so that a displacement of mobile portion 128 in the direction parallel to substrate 100, preferably the direction in which the mechanical space is the smallest, causes a corresponding variation of the mechanical space, and thus of the effective optical index of resonator 124.

Preferably, the direction in which the mechanical space is the smallest and the direction in which the coupling space between portion 116 of waveguide 118 and the resonator is the smallest are the same and correspond, preferably, to a direction of deformation of flexible links 114 when the latter are present.

The mobile portion 128 of structure 102 is fixed to support 104, by a mechanical coupling authorizing the displacement of this mobile portion 128 with respect to support 104, and, more particularly, with respect to the rigid periphery of support 104. Preferably, the mechanical link of mobile portion 128 to support 104 is configured to authorize the displacement of portion 128 in the same direction parallel to the substrate as that for which the optical space and/or the mechanical space are the smallest.

In the example of FIGS. 1 to 4, mobile portion 128 is fixed to support 104 by holding arms 120, each having an end connected to, and in contact with, mobile portion 128, and another end fixed to support 104. For example, in each holding arm 120, the end of arm 120 fixed to support 104 is connected to, and in contact with, an anchor pad 122 connected between support 104 and arm 120. The holding arms 120 which couple mobile portion 128 to support 104 are configured to be less rigid than mobile portion 128 in the direction of displacement of mobile portion 128 relative to support 104. In this embodiment, like mobile portion 128, the holding arms 120 which fix mobile portion 128 to support 104 are defined in layer 126.

In another example not illustrated, instead of holding arms 120, mobile portion 128 comprises a region, preferably arranged on the side opposite to the mechanical space, coupled to support 104 by an anchor pad 122 extending between this region and the support and covering, for example, substantially this entire region. In other words, in this case, mobile portion 128 forms a deformable blade having a free end arranged on the side of the mechanical space and an end fixed to support 104.

Although this is not visible in FIGS. 1 to 4, each link 114 (flexible, semi-rigid, or rigid) may comprise a portion of layer 126.

As an example, during the manufacturing of device 1, layer 126 initially rests on a layer 130, itself resting on substrate 100. Then, different elements, including resonator 124 and waveguide 118, are defined by etching in layer 126. At this step of etching of layer 126, a portion of layer 126 may be left in place in each stack of layers mechanically coupling substrate 100 to the second portion of layer 106, that is, region 108 and region 112 of layer 106 in this example. Then, at least one layer 132 is formed over the assembly, after which layer 106 is formed, by deposition or by transfer, on layer 132. Each anchor pad 122 may be made of the same material as layer 106 by providing, at the location of each pad 122, an opening in layer 132 all the way to layer 126 which will be filled with the material of layer 106 during its deposition, or also made of another material by filling the opening in layer 132 with this material before forming layer 106. Layers 130 and 132 are made of materials selectively etchable over the materials of layers 126 and 106 and of substrate 100. Portions of layer 106 are then removed by etching, for example to define therein support 104, links 114 and, more generally, the parts or portions or regions of layer 106 described in the present application. Then, portions of layers 130 and 132 are removed by sacrificial etching selective over layers 126 and 106 and over substrate 100 to obtain circuit 1. As an example, the etching(s) of layers 130 and 132 are selective over the material of pads 122. As another example, each pad 122 is made of the same material as that of layer 106 and those skilled in the art will then be capable of providing openings in layer 106 and/or in layer 126 so that by controlling the time of selective etching of layer 132, pad 122 is left in place at the end of the etching.

In the above example of manufacturing method, when layer 126 is a semiconductor layer, for example made of silicon, and layer 130 is an insulating layer, for example made of silicon oxide, layer 126 may correspond to the semiconductor layer of a structure of semiconductor-on-insulator (SOI) type formed on substrate 100.

Still in the above example of manufacturing method, in device 1, each stack of layers mechanically coupling substrate 100 to the second portion of layer 106, that is, region 108 and region 112 of layer 106 in this example, may comprise portions left in place of layer 130 and may or not comprise a portion left in place of layer 132. Indeed, it is possible for each of these stacks not to comprise a portion left in place of layer 132 by providing, after the forming of layer 132 on layer 126, for an opening to be etched in layer 132 all the way to layer 126 at the location of the stack. Thus, when layer 106 is then formed by deposition on layer 132, at the location of the stack, the material of layer 106 directly comes into contact with layer 126 due to the through opening in layer 132. Layer 132 may then be planarized.

In another example, layer 106 corresponds to a portion of a first substrate, for example semiconductor, for example made of silicon, layer 132 then resting on this first substrate and layer 126 then resting on layer 132. In the same way as previously, elements, including resonator 124 and waveguide 118, are formed in layer 126. A filling material, for example identical to the material of layer 130, is deposited and then planarized, stopping before or on layer 126. Substrate 100 coated with layer 130 is then transferred onto the structure before the thinning of the first substrate to only leave layer 106 thereof. Then, layer 106 is etched to define the different parts or portions or regions of layer 106, including support 104, after which portions of layers 130 and 132 are removed by etch steps similar to those which have been described for the other above example.

In this other example of manufacturing method, during the transfer of substrate 100 onto the structure comprising the first substrate, layer 130 may already form part of the structure and then rest on layer 126 rather than coating substrate 100, and substrate 100 is then placed into contact with layer 130 during the transfer step.

In this other example of manufacturing method, when layer 126 is a semiconductor layer, for example made of silicon, and layer 132 is an insulating layer, for example made of silicon oxide, layer 126 may correspond to a semiconductor layer of a structure of semiconductor-on-insulator (SOI) type formed on the first substrate.

There have been indicated hereabove two examples of manufacturing of structure 102, and, more generally, of device 1. However, as it has already been previously indicated, those skilled in the art are capable of manufacturing device 1 with usual steps of integrated circuit manufacturing methods. In other words, the steps enabling to obtain device 1 are not limited to the examples described hereabove. For example, for the selective etching of layer 130, an opening may be etched, under support 104, through the entire substrate 100 so that the opening emerges onto the portion of layer 130 which is then removed by selective etching over layer 126.

Preferably, device 1 only comprises a single layer 130 and a single layer 132. However, layer 130 may correspond to a plurality of layers stacked on one another and/or layer 132 may correspond to a plurality of layers stacked on one another.

Within structure 102, portions of layer 126, that is, portion 116 of waveguide 118, resonator 124 and, in the example of FIGS. 1 to 4, mobile portion 128, are separated from support 104 by empty spaces. To obtain these empty spaces, as described hereabove as an example, at least certain portions of the first portion of layer 106, that is, at least certain portions of support 104, may initially rest on a sacrificial layer 132, which is then removed, at least at the locations of these empty spaces, by selective etching of the layer 132 over layers 106 and 126. As an example, before the step of selective etching of layer 132, the latter may extend over the entire surface of layer 126 or only be present at certain locations. As an example, before the step of selective etching of layer 132, layer 132 may have a constant thickness, or may have regions thinner than others.

Although, in the example of FIGS. 1 to 4, device 1 comprises a mobile portion 128, in other examples, this mobile portion 128 may be omitted. This is for example the case:

- when it is desired to detect displacements of portion 116 of waveguide 118 with respect to resonator 124 causing a corresponding modification of the coupling space between waveguide 118 and resonator; or
- when it is desired to detect variations of a parameter modifying the resonance wavelength of resonator 124, for example variations of the optical index of the medium surrounding resonator 124 or temperature variations; or
- when resonator 124 has mechanical deformation modes provided with an optomechanical coupling with the optical mode(s) of resonator 124 and these deformations of resonator 124 are desired to be measured.

As an example, the two sacrificial layers 130 and 132 are made of a same material, selectively etchable over the material(s) of layers 126 and 106, of substrate 100, and, for example, of each pad 122. However, in other examples, layers 130 and 132 may be made of different materials, each selectively etchable over the material(s) of layers 126 and 106, of substrate 100 and, for example, of each pad 122.

As an example, substrate 100 is made of silicon or of arsenic-gallium.

As an example, layer 130 is a silicon oxide layer or a photonic polymer such as for example benzocyclobutene BCB.

As an example, layer 132 is a silicon oxide layer or a photonic polymer such as for example benzocyclobutene BCB.

As an example, each pad 122 is made of silicon, of silicon nitride, or of silicon oxide.

As an example, the thickness of layer 126 is in the range from 40 to 1,000 nm, for example from 50 to 500 nm.

As an example, layer 132 has a thickness greater than 500 nm, for example above the portions of layer 126 having optical properties not to be modified by the proximity of support 104 or of layer 106. However, layer 132 may have a minimum thickness in the range from 20 to 500 nm above portions of layer 126 having optical properties which are desired to be dependent on the space between support 104 and these portions of layer 126, as will for example be illustrated in relation with FIGS. 8 and 9.

As an example, the thickness of layer 130 is greater than 500 nm so that substrate 100 is sufficiently distant from resonator 124 not to modify its optical properties.

As an example, layer 106 has a thickness in the range from 100 nm to several hundreds of micrometers, for example a thickness greater than 1 μm.

As an example, layer 126 has a thickness in the range from 40 nm to 1 μm, preferably in the range from 50 to 500 nm.

There has been described hereabove, in relation with FIGS. 1 to 4, an example of embodiment of device 1. Examples of alternative embodiments of device will now be described. In these alternative embodiments, unless indicated otherwise, all that has been described in relation with the example of embodiment described in relation with FIGS. 1 to 4 applies.

Figure 5:
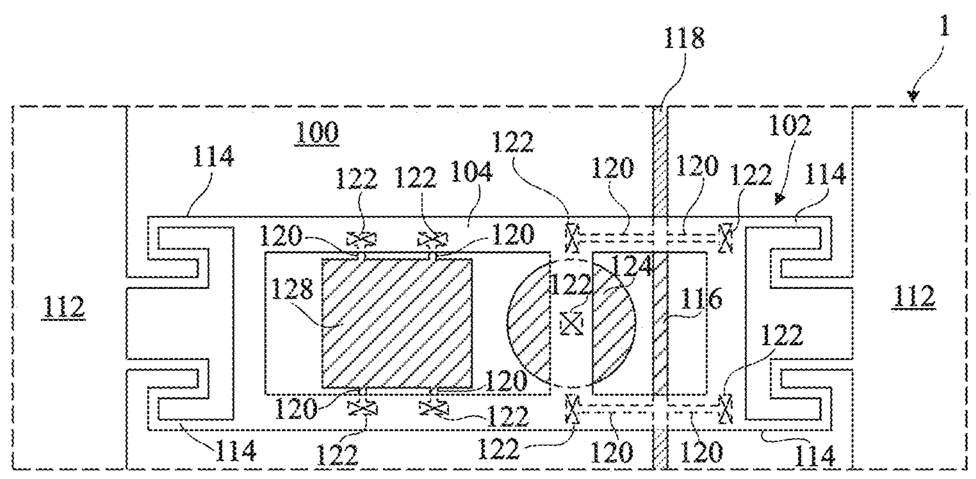
FIG. 5 shows, in a simplified top view, an example of an alternative embodiment of the photonic circuit of FIG. 1.

FIG. 5 shows, in a simplified top view, an example of an alternative embodiment of the photonic circuit 1 described in relation with FIGS. 1 to 4.

In this alternative embodiment, circuit 1 differs from that of the embodiment described in relation with FIGS. 1 to 4 by its support 104.

Indeed, in the embodiment described in relation with FIGS. 1 to 4, support 104 comprises no through opening, that is, no opening thoroughly crossing support 104, across its entire thickness.

In this alternative embodiment, support 104 comprises at least one through opening, and, more particularly, two through openings in the example of FIG. 5.

This enables, for example, particles to reach mobile portion 128, to detect these particle impacts on mobile portion 128 due to the displacements of mobile portion 128 resulting from these impacts. Those skilled in the art will be capable of sizing the opening in support 104 so that particles reach mobile portion 128, even when these particles arrive on the device with a non-zero angle with respect to a direction orthogonal to substrate 100.

The provision of one or of a plurality of through openings may also adapt to the mass of support 104, and thus of structure 102, to obtain a given cut-off frequency in the transmission of mechanical disturbances (deformation of the substrate and/or vibration) to support 104.

However, although support 104 comprises through openings, support 104 keeps a solid peripheral region, for example here of rectangular shape, or U-shaped in other examples not illustrated. This peripheral portion is rigid with respect to the flexible elements of device 1 such as for example flexible links 114 or holding arms 120.

In the example of FIG. 5, structure 102 is coupled to substrate 100 via flexible links 114, but device 1 comprises no anchor pad 110 or rigid or semi-rigid link 114. In other examples not illustrated, device 1 comprises links 114 which are all flexible and anchor pad 110. In still other examples not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one, which is rigid or semi-rigid.

Figure 6:
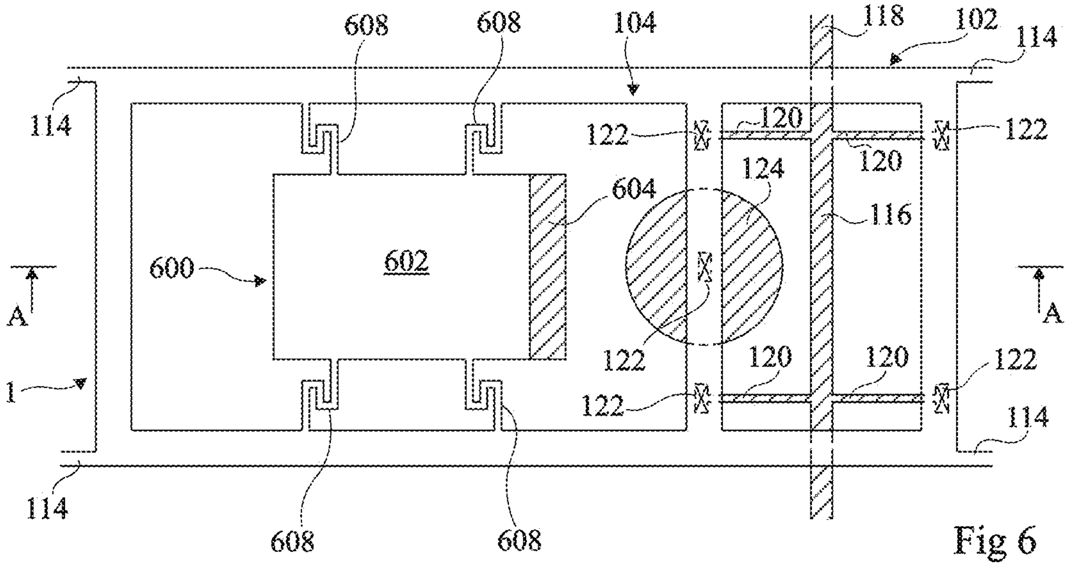
FIG. 6 shows, in a simplified top view, an example of another alternative embodiment of the photonic circuit of FIG. 1.
Figure 7:
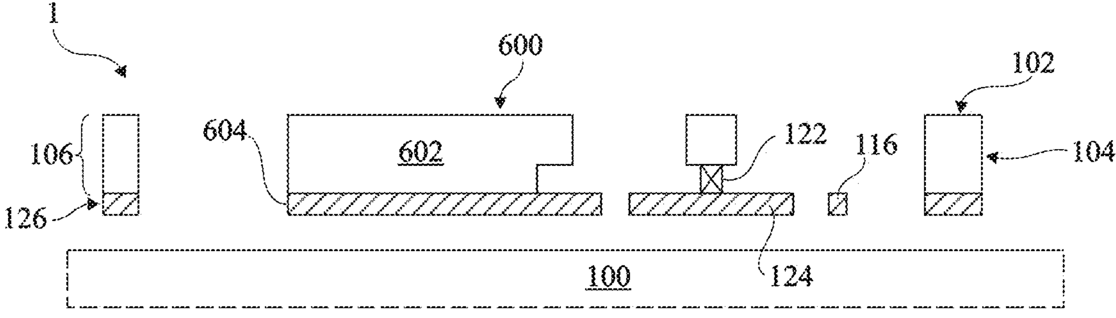
FIG. 7 shows, in a simplified cross-section view, the circuit of FIG. 6 taken in the cross-section plane AA of FIG. 6.

FIG. 6 shows, in a simplified top view, an example of another alternative embodiment of circuit 1, FIG. 7 being a simplified cross-section view taken in the cross-section plane AA of FIG. 6. In FIG. 6, to avoid overloading the drawing, only structure 102 and part of links 114 are shown. Although, in the example of FIGS. 6 and 7, device 1 comprises no anchor pad 110 and only comprises flexible links 114, the others configurations (pad 110 plus flexible links 114, or pad 110 only, or only a rigid or semi-rigid link 114, or only flexible links 114 except for one which is rigid or semi-rigid) enabling to couple structure 102 to substrate 100 also apply to the device 1 of FIGS. 6 and 7.

In this alternative embodiment, circuit 1 differs from that of the embodiment described in relation with FIGS. 1 to 4 and from that of the alternative embodiment described in relation with FIG. 5 by the implementation of the mobile portion of structure 102.

Indeed, in the previously-described examples of embodiments and of alternative embodiments, the mobile portion of structure 102 configured to form the mechanical space with resonator 124 only comprises a portion of layer 126. In this alternative embodiment, the mobile portion of structure 102, designated with reference 600 in FIGS. 6 and 7, comprises not only a portion 604 of the layer 126, but also a portion 602 of support 104, or, in other words, a portion 602 of layer 106, portion 602 of support 104 being mobile with respect to the rigid periphery of support 104. In other words, the mobile portion 600 of structure 102 here comprises a stack of layers comprising portion 604 of layer 126 and portion 602 of support 104.

As compared with the case where the mobile mass only comprises a portion of layer 126, the case where the mobile mass comprises a portion of layer 106 enables, for a comparable bulk in a plane parallel to substrate 100, to have a mobile mass heavier and better adapted to an inertial sensor while a lighter mobile mass only comprising a single portion of layer 126 is better adapted to a gravimetric sensor.

Portion 604 of layer 126 is fixed to the mobile portion 602 of support 104 so that, when the mobile portion 602 of support 104 displaces with respect to the rigid peripheral portion of support 104, portion 604 of layer 126 displaces therewith.

In the example of FIGS. 6 and 7, portion 604 of layer 126 is connected to the mobile portion 602 of support 104. However, in other examples not illustrated, a portion of the sacrificial layer 132 may be left in place between portion 602 and portion 604.

In a direction parallel to substrate 100, the mobile portion 600 of structure 102, and, more particularly, portion 604 of layer 126, is separated from resonator 124 by the mechanical space. The mechanical space, or, in other words, mobile portion 600 and resonator 124, are configured so that a displacement of mobile portion 600 in a direction parallel to substrate 100, preferably in the direction in which the mechanical space is the smallest, causes a corresponding variation of the mechanical space, and thus of the effective optical index of resonator 124.

For portion 602 of support 104 to be mobile with respect to the rigid periphery of support 104, portion 602 is coupled to the periphery of the support by flexible (or deformable) links 608. Preferably, links 608 are deformable in the displacement direction of the mobile portion 600 of structure 102.

As an example, each link 608 is implemented by a portion of support 104, extending between the mobile portion 602 of support 104 and the periphery of support 104. For example, each link 608 has the shape of a beam, or of a plurality of beams placed end-to-end to form at least one meander. Each beam has, in a plane parallel to substrate 100, a transverse dimension for example configured to allow the displacement of portion 602 of support 104 with respect to the periphery of support 104.

As an example, each link 608 may comprise, in addition to a portion of support 104, a portion of layer 126, or even also a portion of layer 132.

Due to the fact that the mobile portion 600 of structure 102 comprises a portion 602 of support 104, this enables to increase its mass with respect to a case where it only comprises a single portion of layer 126 as described in relation with FIGS. 1 to 5. This is for example advantageous when device 1 is used as an inertial sensor.

As an example, portion 604 of layer 126 and portion 602 of support 104 (and thus of layer 106) may have, in a direction orthogonal to substrate 100, aligned edges. However, in other examples, as is for example the case in FIGS. 6 and 7, portion 604 of layer 126 may extend beyond portion 602 of support 104, for example on the side of resonator 124.

In the example of FIGS. 6 and 7, structure 102 is coupled to substrate 100 via flexible links 114, but device 1 comprises no anchor pad 110 or rigid or semi-rigid link 114. In other examples, not illustrated, device 1 comprises anchor pad 110 and links 114 which are all flexible. In still other examples not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one which is rigid or semi-rigid.

Figure 8:
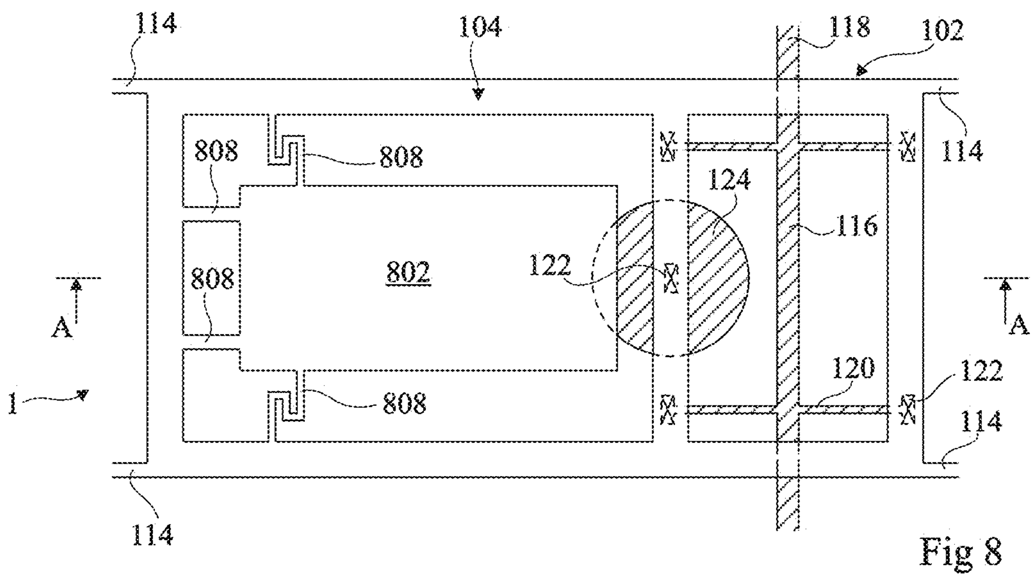
FIG. 8 shows, in a simplified top view, an example of still another alternative embodiment of the photonic circuit of FIG. 1.
Figure 9:
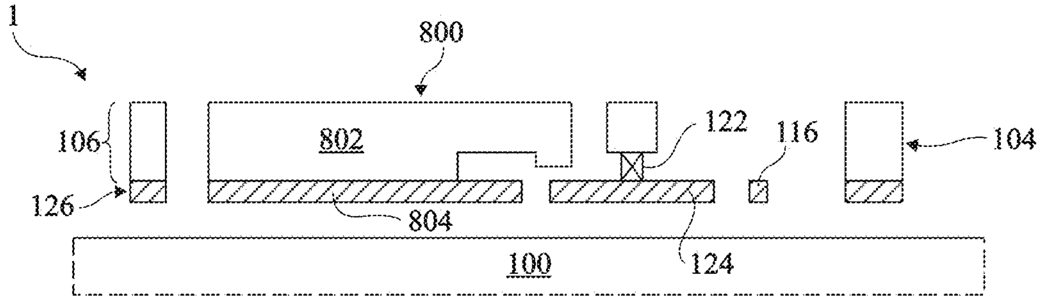
FIG. 9 shows, in a simplified cross-section view, the circuit of FIG. 8 taken in the cross-section plane AA of FIG. 8.

FIG. 8 shows, in a simplified top view, an example of another alternative embodiment of circuit 1, FIG. 9 being a simplified cross-section view taken in the cross-section plane AA of FIG. 8. In FIG. 8, to avoid overloading the drawing, only structure 102 and part of links 114 are shown.

In this alternative embodiment, circuit 1 differs from those of the embodiments and of the alternative embodiments described in relation with FIGS. 1 to 7 by the implementation of the mobile portion of structure 102, this mobile portion being designated with reference 800 in FIGS. 8 and 9.

More particularly, while in the embodiments and alternative embodiments described in relation with FIGS. 1 to 7, the mechanical space belongs to a plane parallel to substrate 100, in this variant, the mechanical space between the mobile portion 800 of structure 102 and resonator 124 is defined in a direction orthogonal to substrate 100. In other words, in the variant described in relation with FIGS. 8 and 9, the mobile portion 800 of structure 102 covers a portion of resonator 124.

The mobile portion 800 of structure 102 comprises a portion 802 of support 104, mobile with respect to the rigid periphery of support 104, and may comprise a portion 804 of layer 126. In the example illustrated in FIGS. 8 and 9, the mobile portion 800 of structure 102 comprises a stack of layers comprising portion 802 of support 104 and portion 804 of layer 126. For example, portion 804 of layer 126 is fixed to the mobile portion 802 of support 104.

In a direction orthogonal to substrate 100, the mobile portion 800 of structure 102, and, more particularly, a region of portion 802 of support 104 which covers a corresponding region of resonator 124, is separated from resonator 124 by the mechanical space. The mechanical space, or, in other words, mobile portion 800 and resonator 124, are configured so that a displacement of mobile portion 800 in a direction orthogonal to substrate 100 causes a corresponding variation of the mechanical space, and thus of the effective optical index of resonator 124.

For portion 802 of support 104 to be mobile in a direction orthogonal to substrate 100, and, more particularly, for the region of portion 802 arranged in front of resonator 124 to be mobile orthogonally to substrate 100, portion 802 is coupled to the periphery of the support by flexible (or deformable) links 808. Preferably, links 808 are deformable in the direction of displacement of the mobile portion 800 of structure 102.

As an example, each link 808 is implemented by, or comprises, a portion of support 104, extending between the mobile portion 802 of support 104 and the rigid periphery of support 104. For example, each link 808 has the shape of a beam, or of a plurality of beams placed end-to-end to form at least one meander. Each beam has, in a plane parallel to substrate 100, a transverse dimension for example configured to allow the displacement of portion 802 of support 104 with respect to the periphery of support 104. As an example, in a plane parallel to substrate 100, the connection of links 808 to the mobile portion 802 of support 104 is closer to an edge of portion 802 which is on the side opposite to the mechanical space than to the edge of portion 802 which is at least partly arranged above resonator 124.

As an example, each link 808 may comprise, in addition to a portion of support 104, a portion of layer 126, or even also a portion of layer 132.

In the example of FIGS. 8 and 9, structure 102 is coupled to substrate 100 via flexible links 114, but device 1 comprises no anchor pad 110 or rigid link 114. In other examples not illustrated, device 1 comprises anchor pad 110 and links 114 which are all flexible. In still other examples not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one, which is rigid or semi-rigid.

Figure 10:
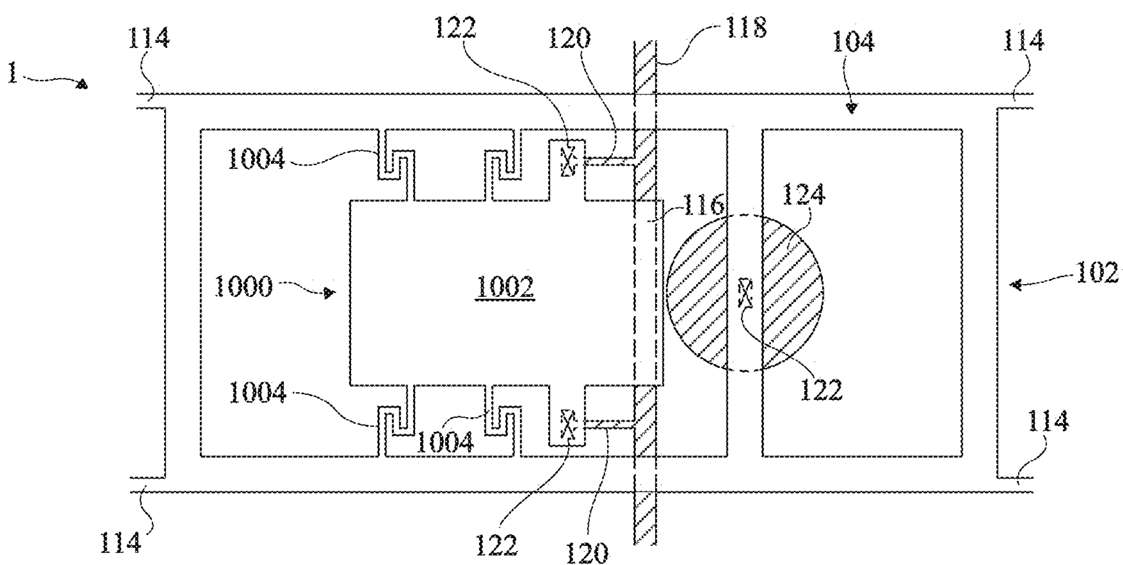
FIG. 10 shows, in a simplified top view, an example of still another alternative embodiment of the photonic circuit of FIG. 1.

FIG. 10 shows, in a simplified top view, an example of another alternative embodiment of circuit 1. In FIG. 10, to avoid overloading the drawing, only structure 102 and part of links 114 are shown.

In the embodiments and alternative embodiments described in relation with FIGS. 6 to 9, portion 116 of waveguide 118 and resonator 124 are fixed to portions of support 104 other than the mobile portion 602 or 802 of support 104 so that the relative positions of portion 116 and of resonator 124 with respect to each other are fixed, and, further, the optical space is distinct from the mechanical space.

In the alternative embodiment illustrated in FIG. 10, the optical space and the mechanical space are one and the same. For this purpose, as in FIGS. 6 to 9, structure 102 comprises a portion 1000 mobile with respect to the periphery of support 104, this mobile portion 1000 corresponding to a portion 1002 of support 104. Further, in this variant, portion 116 of waveguide 118 is fixed to the mobile portion 1002 of support 104 while resonator 124 is fixed to another portion of support 104, for example to a portion of support 104 which is not mobile with respect to the periphery of support 104. Thus, when mobile portion 1000, 1002 displaces, for example in a plane parallel to the substrate and, preferably, in a direction in which the optical space and the mechanical space are measured, this causes a corresponding displacement of portion 116 of waveguide 118 with respect to resonator 124, and thus a corresponding modification of the optical coupling between waveguide 118 and resonator 124.

The mobile portion 1002 of support 104 is coupled to the peripheral portion of support 104 by flexible links 1004, each comprising a portion of support 104. These flexible links 1004 are implemented similarly to the previously-described flexible links 608 and 808, to allow the displacement of portion 1002 of support 104 with respect to its periphery in a direction parallel to substrate 100, preferably in the direction in which the optical and mechanical space is determined.

Portion 116 of waveguide 118 is fixed to the mobile portion 1002 of support 104, for example by holding arms 120 each having an end connected to portion 116 and another end connected to a pad 122 fixing arm 120 to portion 1002 of support 104. Preferably, the holding arms are configured to be rigid in the direction of displacement of portion 1002 with respect to the periphery of support 104.

In the shown example, portion 1002 of the support covers part of portion 116 of waveguide 118 and a portion of the optical and mechanical space. However, in other examples not illustrated, this may not be the case.

In the example of FIGS. 9 and 10, structure 102 is coupled to substrate 100 via flexible links 114, but device 1 comprises no anchor pad 110 or rigid link 114. In other examples not illustrated, device 1 comprises anchor pad 110 and links 114 which are all flexible. In still other examples not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one, which is rigid or semi-rigid.

Figure 11:
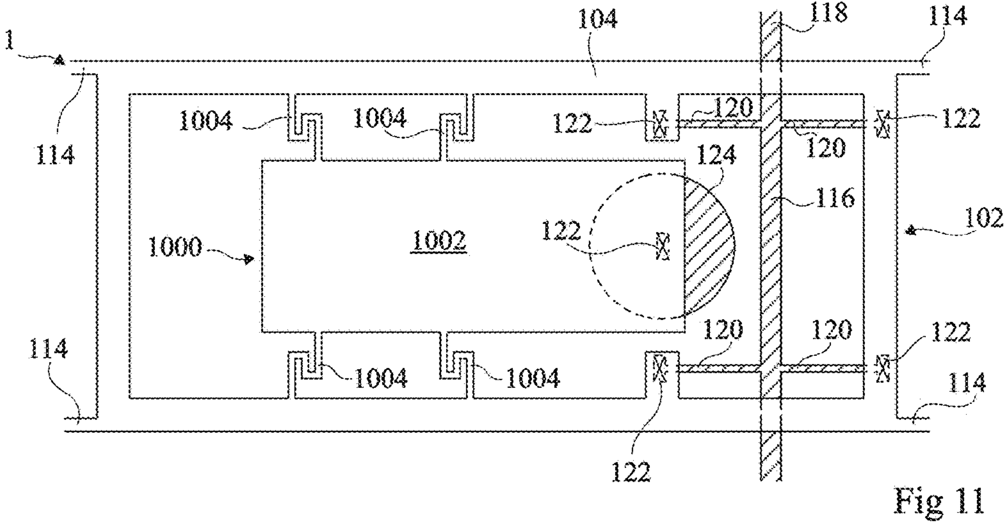
FIG. 11 shows, in a simplified top view, an example of still another alternative embodiment of the photonic circuit of FIG. 1.

FIG. 11 shows, in a simplified top view, an example of another alternative embodiment of circuit 1. In FIG. 11, to avoid overloading the drawing, only structure 102 and part of links 114 are shown.

The alternative embodiment illustrated in FIG. 11 differs from that illustrated in FIG. 10 by the fact that in FIG. 11, resonator 124 is fixed to the mobile portion 1002 of support 104 and portion 116 of waveguide 118 is fixed to another portion of support 104, for example to a portion of support 104 which is not mobile with respect to the periphery of support 104.

Indeed, in the alternative embodiment of FIG. 10, portion 116 of waveguide 118 is fixed to the mobile portion 1000 of structure 102, more particularly to the mobile portion 1002 of support 104, and resonator 124 is fixed to a portion of support 104 other than its mobile portion 1004, so that the displacement of mobile portion 1002 with respect to this other portion of support 104 causes a corresponding modification of the optical and mechanical space. Symmetrically, in the alternative embodiment of FIG. 11, resonator 124 is fixed to the mobile portion 1000 of structure 102, more particularly to the mobile portion 1002 of support 104, and portion 116 of waveguide 118 is fixed to a portion of support 104 other than its mobile portion 1004, so that the displacement of mobile portion 1002 with respect to this other portion of support 104 causes a corresponding modification of the optical and mechanical space.

In the example of FIG. 11, structure 102 is coupled to substrate 100 via flexible links 114, but device 1 comprises no anchor pad 110 or rigid or semi-rigid link 114. In other examples, not illustrated, device 1 comprises anchor pad 110 and links 114 which are all flexible. In still other examples, not illustrated, device 1 comprises no link 114 but comprises a single anchor pad 110. In still other examples, not illustrated, device 1 comprises no pad 110 and comprises either a single link 114 which is rigid or semi-rigid, or a plurality of links 114 which are all flexible except for one, which is rigid or semi-rigid.

In the alternative embodiments of FIGS. 10 and 11, support 104 comprises a portion 1002 which is mobile with respect to the rigid periphery of support 104 and coupled thereto by flexible links 1004. Further, among portion 116 of waveguide 118 and resonator 124, one is fixed to portion 1002 of support 104, while the other is fixed to a portion of support 104 fixed with respect to the periphery of support 104, to define an optical and mechanical space between portion 116 and resonator 124.

In alternative embodiments of the previously-described devices 1, support 104 comprises at least a portion 1200, called decoupling portion 1200, for example frame-shaped, which is coupled, by flexible or semi-rigid links 1202 similar to flexible links 114 or to a semi-rigid link 114, to the portion of support 104 which is connected to pad 110 and/or to links 114. At least optical resonator 124 and, preferably, mobile portion 1000, 800, 600 when there is one, are mechanically coupled to the portion of support 104 which is connected to pad 110 and/or to links 114 via a mechanical link comprising decoupling portion(s) 1200 and links 1202. When there is a plurality of decoupling portions 1200, the latter are embedded in one another, for example concentrically, and are mechanically coupled two by two by links 1202. Among optical resonator 124, portion 116 of waveguide 118, and, when there is one, mobile portion 1000, 800, 600, or 128, at least optical resonator 124 and, preferably, mobile portion 1000, 800, 600 where there is one, are more directly mechanically coupled to the decoupling portion 1200 most distant from the portion of support 104 which is connected to pad 110 and/or to links 114 than to the others decoupling portions 1200.

The provision of one or a plurality of decoupling portions 1200 coupled by flexible or semi-rigid links 1202 to the portion of support 104 which is connected to links 114 and/or to pad 110 enables for mechanical disturbances transmitted from substrate 100 to the portion of support 104 which is connected to pad 110 and/or to links 114 to be filtered and not to be transmitted to resonator 124, to portion 116 of waveguide 118 and, when there is one, to mobile portion 1000, 800, 600, or 128.

For example, flexible links 114 and a connection of pad 110 to support 104 more particularly enable to avoid for slow or permanent deformations of substrate 100 to be transmitted to structure 102, and the flexible or semi-rigid links 1202 enable to avoid for vibrations of substrate 100, relatively fast with respect to deformations thereof and which might be transmitted via pad 110 and/or flexible links 114 to the portion of support 104 which is connected to these links 114 and/or this pad 110, to be transmitted from the portion of support 104 which is connected to links 114 and/or to pad 110 towards a decoupling portion or a plurality of decoupling portions 1200 to which are fixed resonator 124 and/or portion 116 of waveguide 118 and/or a mobile portion 128, 600, 800, or 1000.

Figure 12:
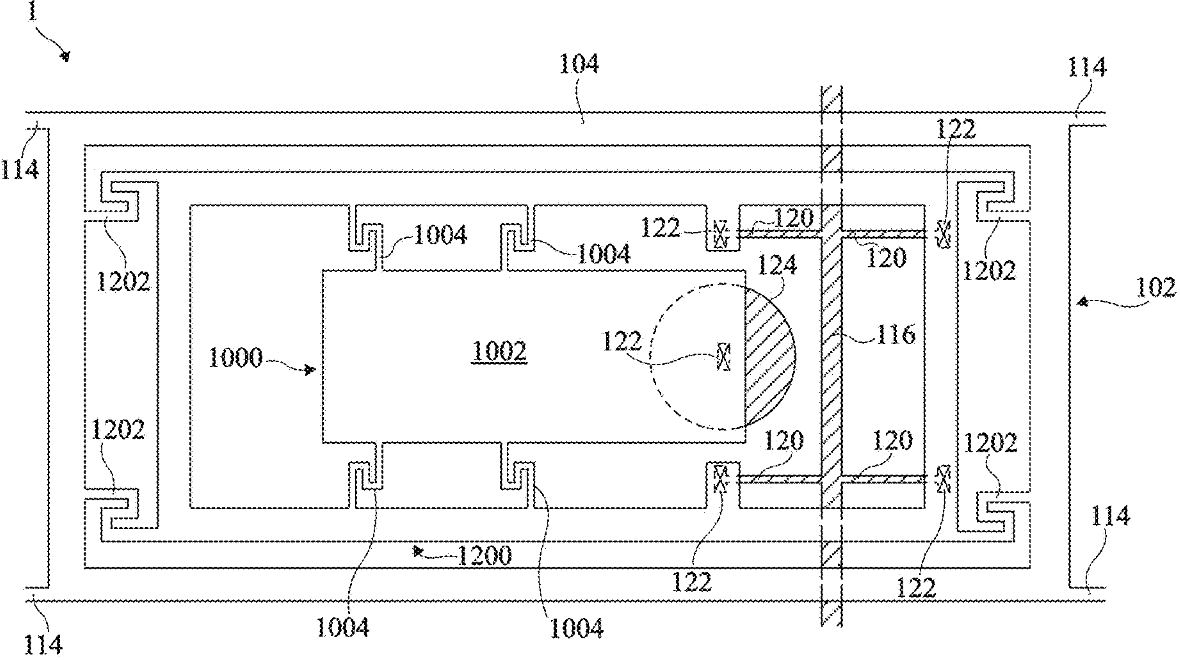
FIG. 12 shows, in a simplified top view, an example of still another alternative embodiment of the photonic circuit of FIG. 1.

FIG. 12 shows a top view of device 1 according to an example of such an alternative embodiment. In FIG. 12, to avoid overloading the drawing, only structure 102 and part of links 114 are shown. In the example of FIG. 12, structure 102 is coupled to substrate 100 via flexible links 114, but device 1 comprises no anchor pad 110 or rigid or semi-rigid link 114. In other examples not illustrated, device 1 comprises anchor pad 110 and links 114 which are all flexible. In still other examples not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one, which is rigid or semi-rigid.

More particularly, the device 1 of FIG. 12 corresponds to the device 1 of FIG. 11 with the difference that the support 104 of FIG. 12 comprises at least one decoupling portion 1200, and more particularly a single decoupling portion 1200 in this example. As an example, portion 1200 has the shape of a frame, for example rectangular, although this portion 1200 may also have a U shape or still other shapes.

Portion 1200 is rigid, for example at least as rigid as the portion of support 104 which is connected to links 114 and which would have been connected to pad 110 if there had been one.

Portion 1200 is fixed to the portion of support 104 which is connected to links 114, in this example the periphery of the support, by flexible or semi-rigid links 1202. These flexible or semi-rigid links 1202 are similar to flexible links 114 or to a semi-rigid link 114 enabling to fix support 104 to region 112 of layer 106, and thus structure 102 to substrate 100. These links 1202 may also be similar to the previously-described flexible links 1004, 808, and 608. In particular, these links 1202 are, preferably, at least partly formed in the first portion of layer 106, that is, the portion of layer 106 forming support 104.

Further, in this example, portion 116 of waveguide 118 and the mobile portion 1000 of structure 102, or portion 1002 of support 104, are mechanically coupled to the portion of support 104 which is connected to links 114 and to pad 110 if there had been one, by a mechanical link comprising portion 1200 and links 1202. For example, the mobile portion 1000 of structure 102, or portion 1002 of support 104, is fixed to frame 1200 by flexible links 1004, and portion 116 of waveguide 118 is fixed to frame 1200 by holding arms 120, each having an end connected to portion 116, and an end fixed to frame 1200 via a pad 122. In device 1, as in FIG. 11, resonator 124 is fixed to the mobile portion 1002 of support 104, for example by a pad 122.

Although in the example of FIG. 12, support 104 only comprises a single portion 1200, in other examples not illustrated, support 104 comprises a plurality of interwoven portions 1200, the implementation of these other examples being within the abilities of those skilled in the art based on the present description.

Further, although there has been described herein the case of a device 1 similar to that of FIG. 11 with the difference that its support 104 comprises at least one decoupling portion 1200 and links 1202, those skilled in the art are capable, based on the present description, of modifying the supports 104 of the devices 1 described in relation with FIGS. 1 to 10 to introduce therein at least one portion 1200 and links 1202.

Figure 13:
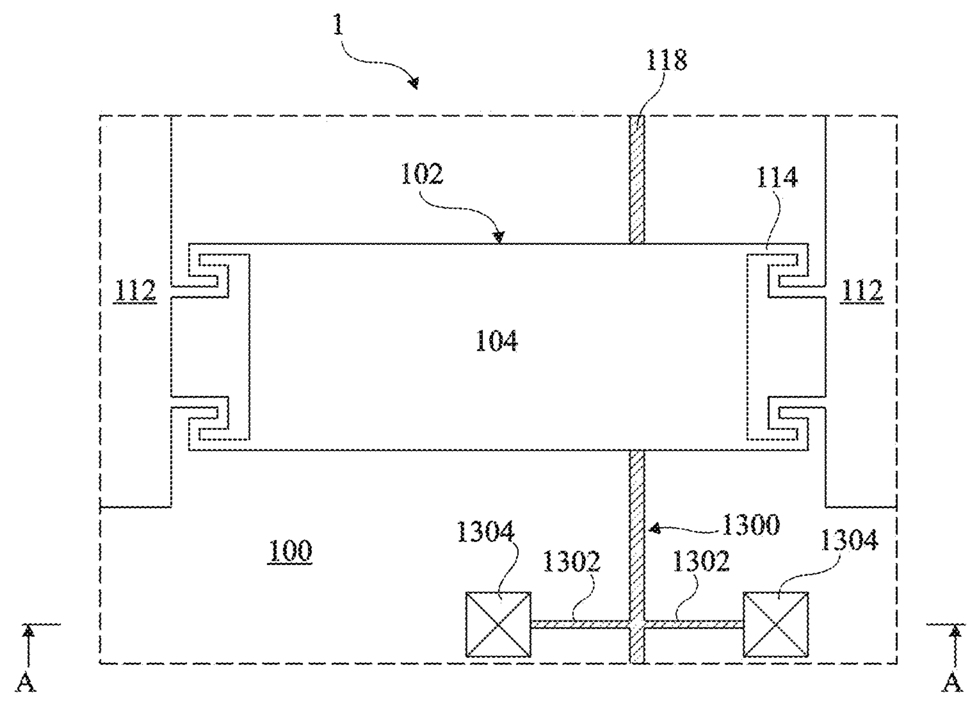
FIG. 13 shows, in a simplified top view, an example of embodiment of a portion of the photonic circuit of FIGS. 1 to 12.

FIG. 13 shows, in a simplified top view, an example of embodiment of a portion of the circuit 1 of FIGS. 1 to 12, FIG. 14 being a cross-section view taken in plane AA of FIG. 13.

Figure 14:
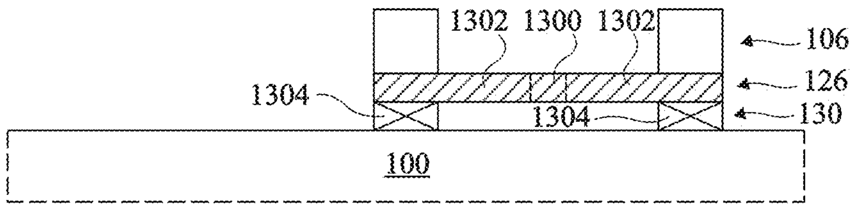
FIG. 14 shows a simplified cross-section view taken in the cross-section plane AA of FIG. 13.

More particularly, FIGS. 13 and 14 show, in the device 1 of FIGS. 1 to 4 comprising no pad 110, how waveguide 118, in addition to comprising a portion 116 (not visible in FIG. 13) fixed to support 104, further comprises a portion 1300 which is fixed to substrate 100. In the example of FIGS. 13 and 14, structure 102 is coupled to substrate 100 via flexible links 114, but device 1 comprises no anchor pad 110 or rigid or semi-rigid link 114. In other examples, not illustrated, device 1 comprises anchor pad 110 and links 114 which are all flexible. In still other examples, not illustrated, device 1 comprises no link 114 but comprises a single anchor pad 110. In still other examples not illustrated, device 1 comprises no pad 110 and comprises either a single link 114 which is rigid or semi-rigid, or a plurality of links 114 which are all flexible except for one, which is rigid or semi-rigid.

Portion 1300 of waveguide 118 does not form part of suspended structure 102, that is, it is not fixed to structure 102, or, here in other words, it is, preferably, not arranged under support 104 conversely to portion 116 of waveguide 118.

Portion 1300 of waveguide 118 is fixed to substrate 100 by holding arms 1302. Preferably, the portion 1300 fixed to substrate 100 is arranged sufficiently far from portion 116 for deformations of substrate 100 transmitted to this portion 1300 not to modify the relative positions of portion 116 and of resonator 124 with respect to each other. Arms 1302 are defined in layer 126, the limit between portion 1300 and arms 1302 being indicated by dotted lines in FIG. 14. Arms 1302 are similar to arms 120 with the difference that their ends which are not connected to portion 1300 are fixed to substrate 100. For example, each arm 1302 has an end connected to portion 1300 and an end fixed to substrate 100 by an anchor pad 1304. For example, each pad 1304 has a surface in contact with substrate 100 and a surface in contact with the end of an arm 1302. For example, each pad 1304 corresponds to a portion of layer 130 left in place during the selective etching thereof.

As an example, as illustrated in FIG. 14, the end of each arm 1302 which rests on top of and in contact with a corresponding pad 1304 may be coated with a portion of layer 106, or, although this is not illustrated, with a stack of a portion of sacrificial layer 132 left in place at the step of selective etching and with a portion of layer 106. In other examples, no portion of layers 106 and/or 132 covers the end of each arm 1302 resting on top of and in contact with a corresponding pad 1304.

In this example, each arm 1302, like each of the examples of arms 120 described up to now, is a beam defined in layer 126, or, in other words, corresponds to a portion of layer 126 having the shape of a beam. Thus, each of these arms 1302 or 120 is more rigid in the longitudinal direction of the arm than in a transverse direction of the arm.

Although, in FIG. 13, portion 1300 is rectilinear, in examples not illustrated, this portion 1300 may comprise curved portions to dampen or withstand the displacements of substrate 100 relative to structure 102.

Figure 15:
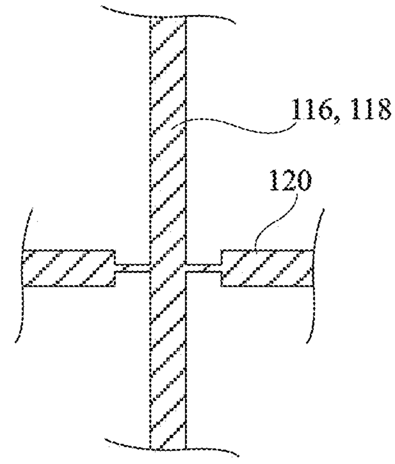
FIG. 15 shows, in a simplified top view, an example of an alternative embodiment of a portion of the photonic circuit of FIGS. 1 to 14.

FIG. 15 shows, in a simplified top view, an example of an alternative embodiment of a portion of the circuit 1 of FIGS. 1 to 14, and, more particularly, an alternative embodiment of an arm 120, although this variant may apply to arms 1302. In FIG. 15, only a portion of waveguide 118, and more particularly here a portion of portion 116 of waveguide 118, is shown, and only a portion of each arm 120, that is, a portion of arm 120 in contact with waveguide 118, is shown.

As compared with the previous examples of arms 120 where each arm 120 would correspond to a beam of constant cross-section defined in layer 126, in FIG. 15, for each arm 120, the end which is in contact with waveguide 118 has a cross-section area smaller than that of the rest of the arm. This enables to limit optical losses in waveguide 118, which result from the connection of arms 120 to waveguide 118.

Figure 16:
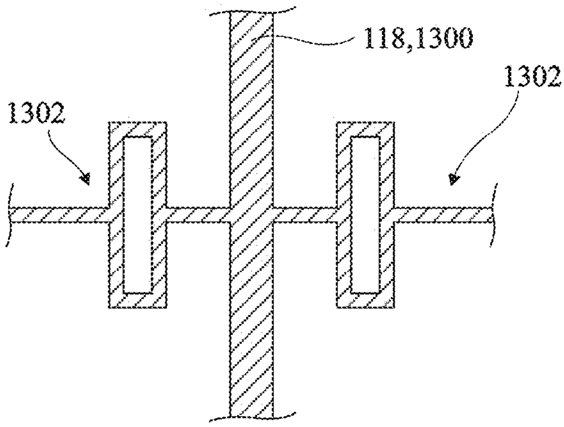
FIG. 16 shows, in a simplified top view, an example of another alternative embodiment of a portion of the photonic circuit of FIGS. 1 to 14.

FIG. 16 shows, in a simplified top view, an example of an alternative embodiment of a portion of the circuit 1 of FIGS. 1 to 14, and, more particularly, an alternative embodiment of an arm 1302. In FIG. 15, only a portion of waveguide 118, and more particularly herein a portion of portion 1300 of waveguide 118, is shown, and only a portion of each arm 1302, that is, a portion of arm 1302 in contact with waveguide 118, is shown.

As compared with the previous examples where each arm 1302 would correspond to a beam of constant cross-section defined in layer 126, in FIG. 15, each arm 1302 comprises a beam defined in layer 126, which is interrupted in a substantially central portion by a rectangular frame also defined in layer 126. In other words, each arm 1302 comprises a first beam portion defined in layer 126, a rectangular frame defined in layer 126, and a second beam portion defined in layer 126. The first beam portion has an end in contact with waveguide 118 and another end in contact with a first side of the rectangular frame, the second beam portion having an end in contact with a second side of the rectangular frame, for example parallel to the first side, and another end fixed to substrate 100.

The alternative embodiment of FIG. 16 is compatible with that of FIG. 15.

Various embodiments and variants have been described. Those skilled in the art will understand that certain features of these various embodiments and variants may be combined, and other variants will occur to those skilled in the art. In particular, although there have been previously described devices 1 where layer 126, and thus the elements defined in this layer such as for example resonator 124 and portion 116 of waveguide 118, are arranged between support 104 and substrate 100, in alternative embodiments not illustrated of these devices, layer 114, and thus the elements defined in this layer, such as for example resonator 124 and portion 116 of waveguide 118, are arranged above support 104, the latter then being arranged between substrate 100 and layer 114. Those skilled in the art will be capable, based on the above description, of implementing these alternative embodiments, and, in particular of manufacturing these devices 1 by using steps usual in integrated circuit manufacturing.

Finally, the practical implementation of the described embodiments and variants is within the abilities of those skilled in the art based on the functional indications given hereabove. In particular, based on the above description, those skilled in the art are capable of implementing links 114 and/or 608 and/or 808 and/or 1004 and/or 120 and/or 1302 enabling, when device 1 is at rest, to keep the optical space and/or the mechanical space constant and independent from the deformations of substrate 100. Particularly, those skilled in the art are capable of implementing:

- rigid mechanical links, that is, links having, for example, a rigidity greater than or equal to that of the portion of support 104 to which these links are connected;
- flexible mechanical links, that is, links having, for example, a rigidity at least 10 times smaller than that of the portion of support 104 to which these links are connected; and
- mechanical links, semi-rigid or of intermediate rigidity, that is, links having, for example, a rigidity greater than that of the flexible links and smaller than that of the portion of support 104 to which these links are connected.

What is claimed is:

1. Photonic device comprising:

a substrate; and a structure comprising a support, an optical resonator fixed to the support, and a portion of a waveguide, the portion of the waveguide being optically coupled to the optical resonator, wherein:

the portion of the waveguide is fixed to the support;

the structure is suspended above the substrate;

the portion of the waveguide and the resonator are arranged on a same side of the support, under the support;

the support corresponds to a first portion of a first layer;

a second portion of the first layer is fixed to the substrate; and the support is mechanically coupled to the second portion of the first layer;

the waveguide and the resonator are defined in a same third layer;

the waveguide comprises another portion which does not form part of the structure and is arranged beyond the structure; and arms defined in the third layer each comprises an end in contact with this other portion of the waveguide arranged beyond the structure and an end fixed to the substrate.

2. Device according to claim 1, wherein the mechanical coupling of the support to the second portion of the first layer comprises:

a connection of the support to a first region of the second portion of the first layer; and/or at least one third portion of the first layer suspended above the substrate and being connected on the one hand to a second region of the second portion of the first layer and on the other hand to the support.

3. Device according to claim 2, wherein the mechanical coupling of the support (104) to the second portion of the first layer:

comprises the connection of the support to the first region of the second portion of the first layer and comprises no third portion of the first layer, said connection implementing a rigid link between the support and the second portion of the first layer, or comprises said at least one third portion of the first layer and comprises no connection between the support and the second portion of the first layer, said at least one third portion of the first layer comprising:

a plurality of third portions each implementing a flexible link between the support and the second portion of the first layer, or a plurality of third portions, a single one of said third portions implementing a rigid or semi-rigid link between the support and the second portion of the first layer, and the other third portions each implementing a flexible link between the support and the second portion of the first layer, or a single third portion implementing a rigid or semi-rigid link between the support and the second portion of the first layer; or comprises the connection of the support to the first region of the second portion of the first layer and said at least one third portion of the first layer, said connection implementing a rigid link between the support and the first region of the second portion of the first layer, and each third portion of the first layer implementing a flexible link between the support and the second region of the second portion of the first layer.

4. Device according to claim 1, wherein the portion of the waveguide is fixed to the support by arms defined in the third layer, each of said arms having an end in contact with the portion of the waveguide and an end fixed to the support.

5. Device according to claim 1, wherein:

the support comprises at least one decoupling portion;

the support comprises flexible or semi-rigid links coupling said at least one decoupling portion to a portion of the support which is mechanically coupled to the second portion of the first layer; and at least the resonator is more directly mechanically coupled to said at least one decoupling portion than to the portion of the support which is mechanically coupled to the second portion of the first layer.

6. Device according to claim 5, wherein the structure comprises a mobile portion, said mobile portion being more directly mechanically coupled to said at least one decoupling portion than to the portion of the support which is mechanically coupled to the second portion of the first layer.

7. Device according to claim 6, wherein:

the mobile portion of the structure is a mobile portion of the support;

among the resonator and the portion of the waveguide forming part of the structure, one is fixed to the mobile portion of the support and the other is fixed to another portion of the support; and the structure is configured so that a displacement of the mobile portion of the structure in a direction parallel to the substrate causes a corresponding modification of the optical coupling between said portion of the waveguide and the resonator.

8. Device according to claim 7, wherein the mobile portion of the support is mechanically coupled to the rest of the support by flexible links at least partly defined in the first portion of the first layer.

9. Device according to claim 6, wherein:

the mobile portion of the structure comprises a mobile portion of the support;

the portion of the waveguide forming part of the structure and the resonator are fixed to another portion of the support than the mobile portion of the support;

the mobile portion of the support comprises a region arranged in front of a portion of the resonator in a direction orthogonal to the substrate; and the structure is configured so that a displacement of the mobile portion of the structure in the direction orthogonal to the substrate causes a corresponding variation of the effective index of the resonator.

10. Device according to claim 9, wherein the mobile portion of the support is mechanically coupled to the rest of the support by flexible links at least partly defined in the first portion of the first layer.

11. Device according to claim 6, wherein:

the waveguide and the resonator are defined in a same third layer;

the mobile portion of the structure comprises a stack comprising a portion of the third layer and a mobile portion of the support; and in a direction parallel to the substrate, said portion of the third layer is separated from the resonator by a space configured so that a displacement of the mobile portion of the structure in this direction causes a corresponding variation of the effective optical index of the resonator.

12. Device according to claim 11, wherein the mobile portion of the support is mechanically coupled to the rest of the support by flexible links at least partly defined in the first portion of the first layer.

13. Device according to claim 6, wherein:

the waveguide and the resonator are defined in a same third layer;

the mobile portion of the structure is defined in the third layer; and in a direction parallel to the substrate, the mobile portion of the structure is separated from the resonator by a space configured so that a displacement of the mobile portion of the structure in this direction cause a corresponding variation of the effective optical index of the resonator.

14. Device according to claim 13, wherein the mobile portion of the structure is mechanically coupled to the support by at least one portion of the third layer, said at least one portion being less rigid than the mobile portion.

15. Device according to claim 1, wherein the structure comprises a portion mobile with respect to a portion of the support which is mechanically coupled to the second portion of the first layer (106).

16. Device according to claim 15, wherein:

the mobile portion of the structure is a mobile portion of the support;

among the resonator and the portion of the waveguide forming part of the structure, one is fixed to the mobile portion of the support and the other is fixed to another portion of the support; and the structure is configured so that a displacement of the mobile portion of the structure in a direction parallel to the substrate causes a corresponding modification of the optical coupling between said portion of the waveguide and the resonator.

17. Device according to claim 16, wherein the mobile portion of the support is mechanically coupled to the rest of the support by flexible links at least partly defined in the first portion of the first layer.

18. Device according to claim 15, wherein:

the mobile portion of the structure comprises a mobile portion of the support;

the portion of the waveguide forming part of the structure and the resonator are fixed to another portion of the support than the mobile portion of the support;

the mobile portion of the support comprises a region arranged in front of a portion of the resonator in a direction orthogonal to the substrate; and the structure is configured so that a displacement of the mobile portion of the structure in the direction orthogonal to the substrate causes a corresponding variation of the effective index of the resonator.

19. Device according to claim 18, wherein the mobile portion of the support is mechanically coupled to the rest of the support by flexible links at least partly defined in the first portion of the first layer.

20. Device according to claim 15, wherein:

the waveguide and the resonator are defined in a same third layer;

the mobile portion of the structure comprises a stack comprising a portion of the third layer and a mobile portion of the support; and in a direction parallel to the substrate, said portion of the third layer is separated from the resonator by a space configured so that a displacement of the mobile portion of the structure in this direction causes a corresponding variation of the effective optical index of the resonator.

21. Device according to claim 20, wherein the mobile portion of the support is mechanically coupled to the rest of the support by flexible links at least partly defined in the first portion of the first layer.

22. Device according to claim 15, wherein:

the waveguide and the resonator are defined in a same third layer;

the mobile portion of the structure is defined in the third layer; and in a direction parallel to the substrate, the mobile portion of the structure is separated from the resonator by a space configured so that a displacement of the mobile portion of the structure in this direction cause a corresponding variation of the effective optical index of the resonator.

23. Device according to claim 22, wherein the mobile portion of the structure is mechanically coupled to the support by at least one portion of the third layer, said at least one portion being less rigid than the mobile portion.

* * * * *